United States Patent [19]

Pabst et al.

[11] Patent Number: 4,524,626
[45] Date of Patent: Jun. 25, 1985

[54] SOIL EFFECTIVE STRESS SENSOR AND METHOD OF USING SAME

[75] Inventors: Mark W. Pabst; Richard L. Handy, both of Ames, Iowa

[73] Assignee: Iowa State University Research Foundation, Inc., Ames, Iowa

[21] Appl. No.: 540,652

[22] Filed: Oct. 11, 1983

[51] Int. Cl.³ ............................................. G01B 7/16
[52] U.S. Cl. .......................................... 73/784; 73/84
[58] Field of Search ...................... 73/784, 84, 862.65, 73/862.66, 708, 862.67

[56] References Cited

U.S. PATENT DOCUMENTS

| | | |
|---|---|---|
| 2,284,707 | 6/1942 | Wilson . |
| 2,336,500 | 12/1943 | Osterberg .............................. 177/351 |
| 3,303,695 | 2/1967 | Laimins et al. ..................... 73/708 X |
| 3,372,577 | 3/1968 | Bates et al. ........................ 73/726 X |
| 3,529,468 | 9/1970 | Carlson . |
| 3,906,781 | 9/1975 | Vlasblom ............................. 73/784 |
| 4,091,661 | 5/1978 | Handy et al. . |

Primary Examiner—Jerry W. Myracle
Attorney, Agent, or Firm—Zarley, McKee, Thomte, Voorhees & Sease

[57] ABSTRACT

The device of the present invention comprises a frame having at least one sensor mounted thereon. The sensor includes a diaphragm flush with one surface of the frame, a porous filter flush with one surface of the frame, and a strain gauge bonded to diaphragm and in electrical communication with a read-out instrument. A passageway in the frame provides communication between the filter and the diaphragm such that the water pressure of the saturated soil is transmitted through the filter such that the soil pore pressure is exerted on the back side of the diaphragm. Simultaneously, the total pressure of the saturated soil is exerted on the front side of the diaphragm when the device is embedded in the soil. The strain gauge measures the net pressure on the diaphragm which is equal to the soil effective stress, thus giving a direct measurement of such stress.

18 Claims, 7 Drawing Figures

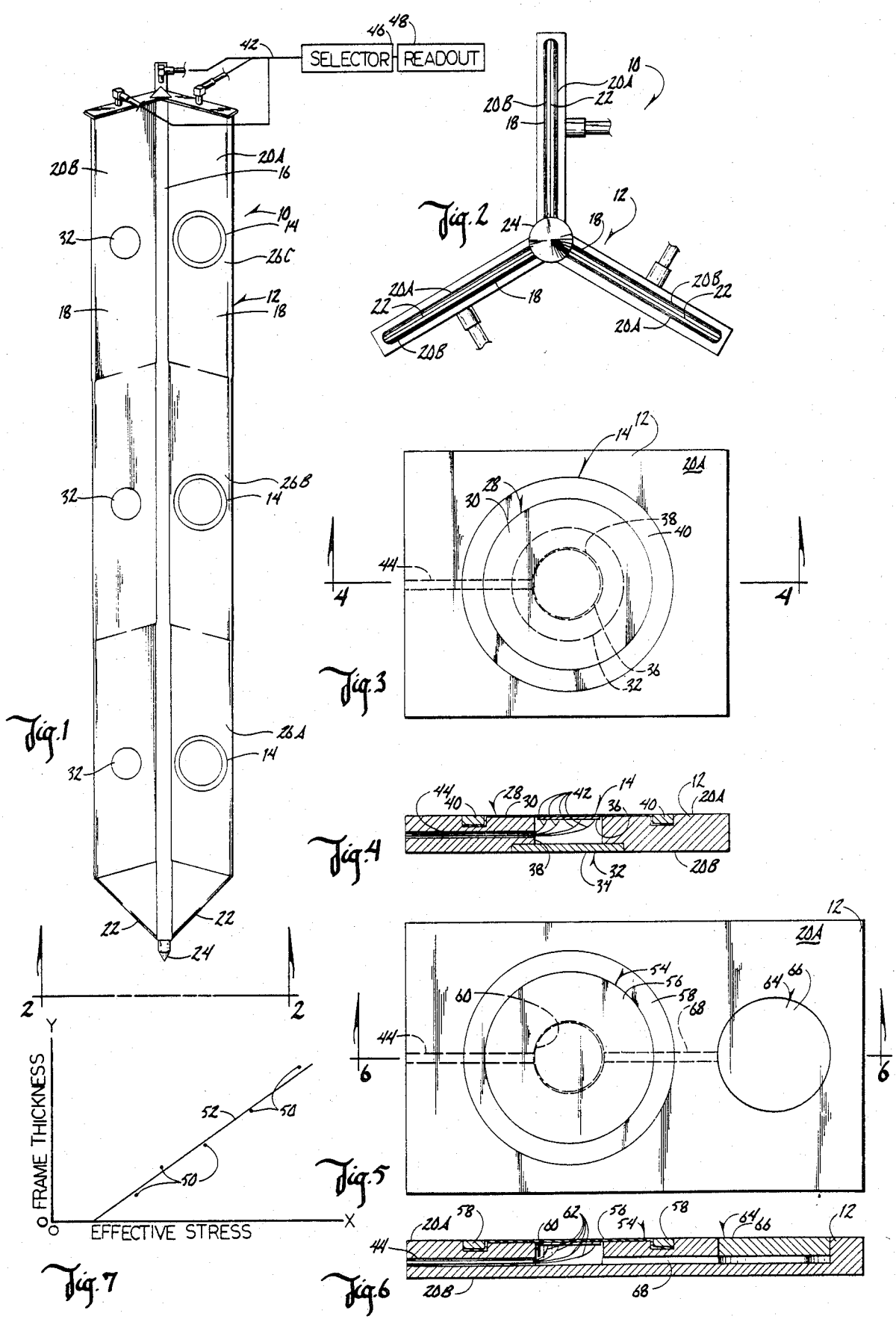

SOIL EFFECTIVE STRESS SENSOR AND METHOD OF USING SAME

REFERENCE GRANT

The work relating to this invention was supported by U. S. Department of Transportation, Federal Highway Administration, Contract No. DTFH61-81-C-00113.

BACKGROUND OF THE INVENTION

For engineering and construction purposes, it is necessary to know the effective stress, or intergranular stress, of saturated soil. Conventional testing devices designed to measure effective stress do so indirectly by subtracting the pore pressure of the soil from the total pressure of the soil. Pore pressure is the pressure exerted by the water in the pores of the soil. Effective stress is the pressure exerted by the soil grains. Total pressure is the sum of pore pressure and effective stress. Such devices typically employ two diaphragms, one being deflected by the total pressure of the soil and the other being deflected by the pore pressure of the soil with the difference therebetween being equal to the effective soil stress. Such indirect measurements result in inaccuracies that lead to further complications when loads are to be placed on the soil.

It is also desirable to minimize the thickness of such an effective stress testing device so as to minimize the distrubance of the soil when the device is embedded therein for testing purposes. The need for two diaphragms increases the thickness of the testing device, thus increasing the disturbance of the soil and leading to further inaccuracies.

Therefore, a primary objective of the present invention is the provision of a device and process for directly measuring soil effective stress.

A further objective of the present invention is the provision of a device and process for mechanically measuring soil effective stress.

A further objective of the present invention is the provision of a device which utilizes a single diaphragm for measuring soil effective stress.

A further objective of the present invention is the provision of a device and process for accurately measuring soil effective stress.

SUMMARY OF THE INVENTION

The device for measuring soil effective stress includes a frame with at least one sensor means mounted thereon. Each sensor means comprises a single flexible diaphragm with a front surface flush with the front surface of the frame, a strain gauge bonded to the back surface of the diaphragm, and a fluid-permeable filter which has a surface flush with the back surface of the frame. The diaphragm, gauge, and filter are positioned concentrically over a bore through the frame which provides communication between the filter and the diaphragm. The bore is filled with oil, as are the pores of the filter. The gauge is electrically connected to a read-out instrument to indicate the effective stress of the soil on the diaphragm.

In an alternate embodiment, the filter and diaphragm are mounted on the same side of the frame such that each has an outer surface flush with that surface of the frame. A communicating channel is provided between the diaphragm and the filter such that the pore pressure of the soil is exerted on the back side of the diaphragm when water passes through the filter.

In operation, the device is embedded or implanted in the soil to the desired depth. Total pressure from the soil is exerted on the front side of the diaphragm so as to deflect the diaphragm inwardly. Meanwhile, water pressure from the pores of the saturated soil is transmitted via the filter and oil-filled cavity to the back side of the diaphragm to deflect the diaphragm outwardly. The net pressure on the diaphragm is sensed by the strain gauge and can be directly read from the read-out instrument. The net pressure is equal to the soil effective stress.

BRIEF DESCRIPTION OF THE DRAWINGS

FIG. 1 is an elevation view of one embodiment of the device for measuring soil effective stress in which a plurality of sensor means are mounted on one type of frame.

FIG. 2 is a bottom plan view of the device taken along lines 2—2 of FIG. 1.

FIG. 3 is an enlarged elevation view of a sensor means of the device.

FIG. 4 is a sectional view taken along line 4—4 of FIG. 3.

FIG. 5 is an enlarged elevation view of an alternative embodiment of the sensor means.

FIG. 6 is a sectional view taken along line 6—6 of FIG. 5.

FIG. 7 shows a graph for determining the undisturbed soil effective stress when a plurality of sensor means are mounted on a frame having varying thicknesses along its length.

DETAILED DESCRIPTION OF THE DRAWINGS

Device 10 of the present invention generally includes a frame 12 and a plurality of sensor means 14. The only function of frame 12 is to maintain the elements of sensor means 14 in a fixed relation. Therefore, frame 12 may be of any configuration convenient to the user. One example of such a frame is that generally described in U.S. Pat. No. 4,091,661, issued May 30, 1978 as shown in FIGS. 1 and 2 in which an elongated shaft 16 has a plurality of blades 18 attached thereto along the length thereof. Blades 18 each have an inwardly tapering lower edge 22 which is bevelled to provide easy penetration of the soil. Shaft 16 has a point 24 at its lowermost end which also aids in embedding device 10 in the soil. Each blade 18 has a plurality of sections 26A, 26B, and 26C, in which the thickness of the sections increases progressively along the length of the blade from section 26A to section 26C. The number of sections may vary. A plurality of sensor means 14 are positioned on a blade 18 at the various sections thereof such that the thickness at any particular sensor means 14 is different from that at any other sensor means 14. Each blade is identical, as is each sensor means 14.

Sensor means 14 includes a flexible diaphragm 28, a porous filter 32, and a strain gauge 36 bonded to the back side of diaphragm 28. In the preferred embodiment, shown in FIGS. 3 and 4, diaphragm 28 is placed into frame 12 such that the outer surface 30 of diaphragm 28 is flush with one surface 20A of frame 12. A retaining ring 40 may be used to hold diaphragm 28 in place by a press fit, or alternatively, diaphragm 28 may be secured to frame 12 with screws (not show). Filter 32 is press-fit into the opposite surface 20B of frame 12 such that the outer surface 34 of filter 32 is flush with surface 20B of frame 12.

A bore 38 extending through frame 12 provides communication between diaphragm 28 and filter 32. Bore 38 is filled with a non-evaporating liquid such as oil. Preferrably, the liquid should be a non-detergent so as not to corrode the electrical components of the device 10.

Diaphram 28 can be made from any suitable material which exhibits good elastic properties, such as a berrylium copper alloy. Filter 32 is a sintered metal filter made from stainless steel, having oil-filled internal cavities measuring approximately 20 microns in diameter.

Porous filter 32 is initially treated with a quaternary ammonium salt (QAS) that reduces the contact angle between the oil and the surficial pore openings and permits easier entrainment of the oil in the filter. One example of a QAS which can be used is Arquad #717-99 sold by Armour Industrial Chemical Company having a methyl group in two positions and the other two being a mixture of 24% hexadecyl, 75% octadecyl and 1% octadeceny. The treatment process consists of placing filter 32 in a solution of QAS, alcohol and deionized water. A vacuum is then applied so that the solution is drawn into the inner pores of the filter. Upon completion of the saturating process, filter 32 is placed in an oven in order to drive off the entrained liquids. The pore surfaces are then coated with QAS. After drying, filter 32 is placed in a container of oil and a vacuum is again applied. Once the pore spaces have been filled with oil, filter 32 is ready to be placed in device 10. The capillary attraction between oil and the pores of filter 32 thus holds back the soil while permitting the water pressure in the soil to be transmitted via the oil to the back of diaphragm 28.

Strain gauge 36 is a standard full bridge electrical foil strain gauge. Strain gauge 36 is electrically connected via electrical wires 42 which pass through an internal channel 44 within frame 12, to a readout instrument 48. Readout instrument 48 may be any standard instrument for registering the pressure on gauge 36, such as the Model P-3500 manufactured by Measurements Group. If a plurality of sensor means 14 are utilized on frame 12, a selector instrument 46 which permits the monitoring of any one of the sensor means may be interposed in the electrical connections between readout instrument 48 and the plurality of sensor means. The selector 46 may be any conventional selective switching device such as that manufactured by Measurements Group, Model SB-1K. Electrical wires 42 are sealed in channel 44 by an appropriate compound to prevent pressure leakage of oil from bore 38 into channel 44.

In operation, device 10 is embedded or implanted in the soil to the desired depth. If device 10 is to be used at great depths, a borehole may be predrilled so that device 10 may be lowered therethrough before being embedded in the soil at the bottom of such a borehole. Device 10 may also be placed in an excavated area or adjacent to a retaining wall and then be covered with the removed soil. When device 10 is in place, the total pressure of the saturated soil is exerted on the outer surface 30 of diaphragm 28 so as to deflect diaphragm 28 inwardly. Meanwhile, the water pressure of the saturated soil is transmitted through filter 32 so that the pore pressure of the soil is exerted on the back side of diaphragm 28 via the oil within bore 38, thus tending to force diaphragm 28 outwardly. The pore pressure force thus opposes the total pressure force on diaphragm 28. Strain gauge 36 measures the net pressure on diaphragm 28 which is registered on read-out instrument 48. The net pressure, that is, the total pressure minus the pore pressure, is equal to the soil effective stress. Therefore, it can be seen that device 10 of the present invention directly measures the soil effective stress by means of filter 32 which withholds the soil while permitting the water pressure therein to be transmitted therethrough so as to exert pressure on the back side of diaphragm 28 while the total pressure of the soil is exerted on the outer surface 30 of diaphragm 28 in a direction opposite to the pore pressure.

When a plurality of sensor means 14 are employed on a frame 12 having various thicknesses at each sensor means, such as that shown by blades 18 in FIG. 1, selector 46 is activated so that read-out instrument 48 displays the effective stress of each sensor means at the various thicknesses of blade 18. The measurements can then be plotted on a graph, such as shown by points 50 in FIG. 7, wherein the X axis corresponds to the effective stress measured, and the Y axis corresponds to the frame thickness at the particular sensor means 14 at which the reading is taken. After all of the effective stress measurements from each of the sensor means 14 have been plotted, a straight line 52 is drawn on the graph such that the sum of the perpendicular distances from points 50 to line 52 is minimized. Line 52 can then be extrapolated back to the X axis where blade thickness is theoretically zero. The value of the effective stress at the X axis thus represents the undisturbed effective stress of the soil, also known as the in situ horizontal stress of the soil.

An alternate embodiment of the present invention is shown in FIGS. 5 and 6. This embodiment is essentially identical to that of the preferred embodiment except that the diaphragm and the filter are mounted on the same side of the frame. More particularly, a flexible diaphragm 54 is placed into frame 12 such that its outer surface 56 is flush with the outer surface 20A of frame 12. Diaphragm 54 is held in place by a press fit retainer ring 58 or by screws (not shown). A strain gauge 60 similar to gauge 36 is bonded to the back side of diaphragm 54 and is in electrical communication with selector instrument 46 and read-out instrument 48 via wires 62 extended through passageway 44 in frame 12. A filter 64 such as that previously described is press-fit into frame 12 such that the outer surface 66 of filter 64 is flush with the outer surface 20A of frame 12 and on the same side as diaphragm 54. An oil filled passageway 68 in frame 12 provides communication between diaphragm 54 and filter 64 so that the alternate embodiment operates identical to the preferred embodiment. This construction with both diaphragm 54 and filter 64 mounted on the same side 20A of frame 12 permits the thickness of the blade to be decreased such that the pressure exerted on the soil by the blade is diminished.

Device 10 can be placed in the soil such that sensor means 14 is in either a vertical or horizontal plane. In the former instance, the in situ horizontal pressure of the soil is measured, as described previously. In the latter, the in situ vertical pressure of the soil is determined. Both of the soil stresses are valuable characteristics which can be applied in various engineering design work.

Thus, it can be seen that the device and operation of the device of the present invention accomplishes at least all of the stated objectives.

What is claimed is:

1. A device for determining the effective stress of saturated soil, comprising:
   a flat frame having front and back surface, and
   a sensor means mounted on said frame for directly measuring the effective stress of the soil when said frame is placed in the ground, said sensor means including a single flexible diaphragm having an outer surface flush with one of the surfaces of said frame, a strain gauge bonded to the inner surface of said diaphragm, a filter spaced apart from said diaphragm, and a bore in said frame providing communication between said diaphragm and said filter.

2. The device of claim 1 wherein said diaphragm and said filter are mounted, respectively, on said front and back surfaces of said frame.

3. The device of claim 1 wherein said strain gauge is in electrical communication with an electric circuit including a read-out instrument for registering the soil effective stress in response to pressure on said diaphragm.

4. The device of claim 2 wherein said bore between said diaphragm and said filter is filled with a non-evaporating liquid.

5. The device of claim 5 wherein the total pressure of said soil is exerted on said outer surface of said diaphragm so as to deflect said diaphragm inwardly while the pore pressure of said soil is transmitted through said filter to exert pore pressure on the inner surface of said diaphragm so as to tend to deflect said diaphragm outwardly, whereby the net pressure on said diaphragm is detected by said strain gauge from which soil effective stress is directly measured.

6. The device of claim 1 wherein the thickness of said frame decreases along the length thereof proceeding from top to bottom.

7. The device of claim 6 wherein a plurality of sensor means are mounted on said frame whereby the thickness of said frame at each sensor means is different from the thickness of said frame at any other sensor means.

8. The device of claim 1 wherein said flexible diaphragm and said filter are flush with the same surface of said frame.

9. A method for determining the effective stress in saturated soil using a device including a flat frame and a sensor means mounted on said frame, said sensor means including a single flexible diaphragm with an outer surface being flush with one flat surface of said frame, a strain gauge bonded to the inner surface of said diaphragm, and a filter spaced apart from said diaphragm with an outer surface flush with one flat surface of said frame, said frame having a liquid-filled bore therein for communication between said diaphragm and said filter, said method comprising:
   placing said frame into the soil,
   permitting said diaphragm to deflect inwardly in response to the total pressure of the soil,
   permitting water pressure from said soil to be transmitted through said filter so as to tend to deflect said diaphragm outwardly in response to the water pressure of the soil,
   and measuring the net pressure on said diaphragm with said strain gauge, said net pressure being equal to the soil effective stress at said sensor means.

10. The method of claim 9 wherein the thickness of said frame varies along the length thereof and a plurality of sensor means are mounted on said frame such that the thickness of said frame at any one sensor means is different from that at any other sensor means.

11. The method of claim 10 further comprising plotting each measurement on a graph wherein the X axis corresponds to effective stress and the Y axis corresponds to frame thickness at the sensor means at which the measurement was taken, drawing a straight line on said graph so as to minimize the sum of the perpendicular distances from the plotted measurements to the line, and extrapolating the line to the X axis wherein the point where said line intersects the X axis is equal to the undisturbed soil effective stress.

12. A device for determining the effective stress of saturated soil, comprising:
   a flat frame having front and back surfaces, and
   a sensor means mounted on said frame for directly measuring the effective stress of the soil when said frame is placed in the ground,
   said sensor means including a single flexible diaphragm having an outer surface flush with one of the surfaces of said frame, a strain gauge bonded to the inner surface of said diaphragm, a filter spaced apart from said diaphragm, and a bore in said frame providing communication between said diaphragm and said filter, whereby the total pressure of said soil is exerted on said outer surface of said diaphragm so as to deflect said diaphragm inwardly while the pore pressure of said soil is transmitted through said filter to exert pore pressure on the inner surface of said diaphragm so as to tend to deflect said diaphragm outwardly, such that the net pressure corresponding to soil effecting stress is directly measured by said strain gauge.

13. The device of claim 12 wherein said diaphragm and said filter are mounted, respectively, on said front and back surfaces of said frame.

14. The device of claim 12 wherein said strain gauge is in electrical communication with an electric circuit including a read-out instrument for registering the soil effective stress in response to pressure on said diaphragm.

15. The device of claim 12 wherein said bore between said diaphragm and said filter is filled with a non-evaporating liquid.

16. The device of claim 12 wherein the thickness of said frame decreases along the length thereof proceeding from top to bottom.

17. The device of claim 12 wherein a plurality of sensor means are mounted on said frame whereby the thickness of said frame at each sensor means is different from the thickness of said frame at any other sensor means.

18. The device of claim 12 wherein said flexible diaphragm and said filter are flush with the same surface of said frame.

* * * * *